(12) United States Patent
Kaal et al.

(10) Patent No.: US 8,238,539 B2
(45) Date of Patent: Aug. 7, 2012

(54) COMMUNICATION SYSTEM

(75) Inventors: Madis Kaal, Dublin (IE); Andres Kütt, Dublin (IE); Mart Oruaas, Dublin (IE); Asko Seeba, Dublin (IE); Taavet Hinrikus, Dublin (IE)

(73) Assignee: Skype, Dublin (IE)

( * ) Notice: Subject to any disclaimer, the term of this patent is extended or adjusted under 35 U.S.C. 154(b) by 1213 days.

(21) Appl. No.: 11/986,976

(22) Filed: Nov. 27, 2007

(65) Prior Publication Data

US 2008/0137829 A1 Jun. 12, 2008

(30) Foreign Application Priority Data

Nov. 27, 2006 (GB) .................................. 0623621.0
Nov. 23, 2007 (GB) .................................. 0723117.8

(51) Int. Cl.
*H04M 3/42* (2006.01)
*H04L 12/66* (2006.01)
(52) U.S. Cl. ............... 379/207.14; 379/211.02; 370/352
(58) Field of Classification Search .................... 379/45, 379/207.14, 211.02, 221.13, 221.14; 370/352
See application file for complete search history.

(56) References Cited

U.S. PATENT DOCUMENTS

| | | | |
|---|---|---|---|
| 6,061,363 A | 5/2000 | Evans et al. | |
| 6,718,028 B2 | 4/2004 | Culli et al. | |
| 6,765,921 B1 | 7/2004 | Stacey et al. | |
| 7,177,837 B2 | 2/2007 | Pegaz-Paquet et al. | |
| 7,298,714 B2 | 11/2007 | Foster | |
| 7,403,517 B2 | 7/2008 | Westman | |
| 7,454,201 B2 | 11/2008 | Brooking et al. | |
| 7,565,436 B2 | 7/2009 | Rabie et al. | |
| 7,675,881 B2 | 3/2010 | Verma et al. | |

(Continued)

FOREIGN PATENT DOCUMENTS

EP 0 695 059 A1 1/1996

(Continued)

OTHER PUBLICATIONS

Notification Concerning Transmittal of International Preliminary Report on Patentability (Chapter for the Patent Cooperation Treaty), from International Application No. PCT/IB2007/004259, dated Jun. 11, 2009.

(Continued)

*Primary Examiner* — Quoc D Tran
(74) *Attorney, Agent, or Firm* — Wolfe-SBMC

(57) ABSTRACT

A method of transmitting a communication event from a calling entity to a called entity located in a communication network comprising a first network and a second network, said method comprising determining a first identity associated with the called entity, wherein the first identity is recognizable in the first network; allocating a calling identity to the called entity, wherein the allocated identity is recognizable in the second network; associating at a first node located in the first network the first identity with the calling identity; providing the calling identity to the calling entity; establishing a connection with a second network node located in the second network; wherein the connection with the second network node is established using the calling identity, querying the first node with the calling identity associated with the called entity to determine the first identity associated with the called entity; transmitting the communication event to the called entity using the first identity associated with the called entity; and disassociating the calling identity from the called entity after querying the first node to determine the first identity associated with the called entity.

21 Claims, 5 Drawing Sheets

U.S. PATENT DOCUMENTS

| | | | |
|---|---|---|---|
| 7,735,126 B2 | 6/2010 | Zhang et al. | |
| 7,756,548 B2 | 7/2010 | Laroia et al. | |
| 7,839,992 B2 | 11/2010 | Croak et al. | |
| 7,929,955 B1 | 4/2011 | Bonner | |
| 8,014,511 B2 | 9/2011 | Kaal et al. | |
| 8,170,563 B2 | 5/2012 | Kaal | |
| 2002/0032631 A1 | 3/2002 | Rose | |
| 2002/0071424 A1 | 6/2002 | Chiu et al. | |
| 2002/0103998 A1 | 8/2002 | DeBruine | |
| 2002/0116464 A1 | 8/2002 | Mak | |
| 2002/0137500 A1 | 9/2002 | Brooking et al. | |
| 2002/0143855 A1 | 10/2002 | Traversat et al. | |
| 2003/0002485 A1 | 1/2003 | Emerson | |
| 2003/0105812 A1 | 6/2003 | Flowers et al. | |
| 2003/0112823 A1 | 6/2003 | Collins et al. | |
| 2003/0130008 A1 | 7/2003 | Rajaniemi et al. | |
| 2003/0224781 A1 | 12/2003 | Milford et al. | |
| 2005/0005030 A1 | 1/2005 | Asai | |
| 2005/0074102 A1* | 4/2005 | Altberg et al. | 379/114.1 |
| 2005/0141509 A1 | 6/2005 | Rabie et al. | |
| 2005/0144327 A1 | 6/2005 | Rabie et al. | |
| 2005/0176410 A1 | 8/2005 | Brooking et al. | |
| 2005/0286519 A1 | 12/2005 | Ravikumar et al. | |
| 2006/0072547 A1* | 4/2006 | Florkey et al. | 370/352 |
| 2006/0077971 A1 | 4/2006 | Fowler | |
| 2006/0227959 A1* | 10/2006 | Mitchell | 379/221.13 |
| 2006/0229101 A1 | 10/2006 | LaBauve et al. | |
| 2006/0258289 A1 | 11/2006 | Dua | |
| 2007/0019623 A1 | 1/2007 | Alt et al. | |
| 2007/0066273 A1 | 3/2007 | Laraia et al. | |
| 2007/0117548 A1 | 5/2007 | Fernandez-Alonso et al. | |
| 2007/0238472 A1 | 10/2007 | Wanless | |
| 2008/0045186 A1* | 2/2008 | Black et al. | 455/413 |
| 2008/0137829 A1 | 6/2008 | Kaal et al. | |
| 2008/0137834 A1 | 6/2008 | Kaal et al. | |
| 2008/0139208 A1 | 6/2008 | Kaal | |
| 2008/0144578 A1 | 6/2008 | Kaal | |
| 2008/0152108 A1 | 6/2008 | Kaal et al. | |
| 2008/0165790 A1 | 7/2008 | Kaal | |
| 2008/0192734 A1 | 8/2008 | Oruaas et al. | |
| 2008/0205308 A1 | 8/2008 | Prehofer et al. | |
| 2012/0033797 A1 | 2/2012 | Kaal et al. | |

FOREIGN PATENT DOCUMENTS

| | | |
|---|---|---|
| EP | 1 515 506 A1 | 3/2005 |
| EP | 1 643 740 | 4/2006 |
| EP | 1690165 | 8/2006 |
| GB | 2 398 458 A | 8/2004 |
| GB | 2 405 285 A | 2/2005 |
| WO | WO 99/67922 | 12/1999 |
| WO | WO 00/51331 A1 | 8/2000 |
| WO | WO 01/24478 A2 | 4/2001 |
| WO | WO 01/39469 | 5/2001 |
| WO | WO 01/63861 | 8/2001 |
| WO | WO 02/076049 | 9/2002 |
| WO | WO 02/078268 A1 | 10/2002 |
| WO | WO 03/003678 A1 | 1/2003 |
| WO | WO 2005/009019 A2 | 1/2005 |
| WO | WO 2005/084128 A2 | 9/2005 |
| WO | WO 2006/095787 A1 | 9/2006 |
| WO | WO 2007/044049 A2 | 4/2007 |
| WO | WO 2007/077550 A1 | 7/2007 |

OTHER PUBLICATIONS

Search Report Under Section 17 for GB 0723123.6, Date of Search: Apr. 18, 2008.

Notification Concerning Transmittal of International Preliminary Report on Patentability (Chapter I of the Patent Cooperation Treaty), from International Application No. PCT/IB2007/004260, dated Jun. 3, 2009.

Notification Concerning Transmittal of International Preliminary Report on Patentability (Chapter I of the Patent Cooperation Treaty), from International Application No. PCT/IB2007/004279, dated Jun. 3, 2009.

"Final Office Action", U.S. Appl. No. 11/986,973, (Apr. 24, 2012), 24 pages.

"Non-Final Office Action", U.S. Appl. No. 13/195,541, (May 25, 2012), 4 pages.

"Non-Final Office Action", U.S. Appl. No. 13/460,249, (Jun. 1, 2012), 9 pages.

"Notice of Allowance", U.S. Appl. No. 11/986,835, (Mar. 15, 2012), 13 pages.

"Notice of Allowance", U.S. Appl. No. 11/986,974, (Mar. 15, 2012), 12 pages.

* cited by examiner

COMMUNICATION SYSTEM

RELATED APPLICATIONS

This application claims priority under 35 U.S.C. §119 or 365 to Great Britain Application No. 0623621.0, filed Nov. 27, 2006 and Great Britain Application 0723117.8, filed Nov. 23, 2007. The entire teachings of the above applications are incorporated herein by reference.

TECHNICAL FIELD

The present invention relates to a method for handling communication in a communication system.

BACKGROUND

Communication systems link together two communication devices so that the devices can send information to each other in a call or other communication event. Information may include voice, text, images or video.

One such communication system is a peer to peer system, in which a plurality of end users can be connected for communication purposes via a communications structure such as the internet. The communications structure is substantially decentralised with regard to communication route switching therein for connecting the end users. That is, the end users can establish their own communication routes through the structure based on exchange of one or more authorisation certificates (user identity certificates—UIC) to acquire access to the structure. The structure includes an administration arrangement issuing the certificates to the end users. Such a communication system is described in WO 2005/009019.

Peer-to-peer systems and other communication systems that use the internet or any other packet switched network employ voice over IP (internet protocol) protocols (VoIP) to transmit data. These systems are commonly referred to as VoIP systems. VoIP systems are beneficial to the user as they are often of significantly lower cost than communication networks, such as fixed line or mobile networks, otherwise referred to as public switched telephone networks (PSTN). This may particularly be the case for long distance calls.

The connection of two communication devices using more than one type of network is becoming increasingly common. In some cases a call may be transmitted via more than one network in an attempt to reduce the cost of the call. For example a call between two devices located in a PSTN network may be transmitted via the internet. In other cases it is necessary to transmit the call via two networks when each device is located in a different network.

In order to place a call from a device located in one network, such as a PSTN network, to a device located in a different network, such as one connected to the internet, it is necessary for the user of the device connected to the internet to register for a PSTN dial in number with the network provider so that calls can be made to the internet user from devices in the PSTN network.

One disadvantage of this arrangement is that a device in the PSTN network can only place calls to devices connected to the internet if the user of the device has registered to have a PSTN number. A further disadvantage of this arrangement is that even if the internet user has registered to have a PSTN number, the user in the PSTN network may only call the user connected to the internet if he is aware of the PSTN number registered to the internet user.

SUMMARY

It is therefore an aim of embodiments of the invention to address at least one of the above identified problems.

According to a first embodiment of the invention there is provided a method of transmitting a communication event from a calling entity to a called entity located in a communication network comprising a first network and a second network, said method comprising determining a first identity associated with the called entity, wherein the first identity is recognizable in the first network; allocating a calling identity to the called entity, wherein the allocated identity is recognizable in the second network; associating at a first node located in the first network the first identity with the calling identity; providing the calling identity to the calling entity; establishing a connection with a second network node located in the second network; wherein the connection with the second network node is established using the calling identity; querying the first node with the calling identity allocated to the called entity to determine the first identity associated with the called entity; transmitting the communication event to the called entity using the first identity associated with the called entity; and disassociating the calling identity from the called entity after querying the first node to determine the first identity associated with the called entity.

According to a second aspect of the present invention there is provided a network node arranged to route a communication event from a calling entity to a called entity located in a communication network comprising a first network and a second network, said node comprising: determining means arranged to determine a first identity associated with the called entity, wherein the first identity is recognizable in the first network; allocating means arranged to allocate a calling identity to the called entity, wherein the calling identity is used to establish a connection with a node in the second network; and to provide the calling identity to the calling entity; storing means arranged to store the first identity in association with the calling identity; retrieval means arranged to search the data store with the calling identity to determine the first identity associated to the called entity, in response to a query from a gateway node, and to provide the gateway node with the first identity such that the gateway node may transmit the communication event to the called entity using the first identity associated to the called entity; and disassociating means arranged to disassociate the calling identity from the called entity after retrieval means has provided the first identity to the gateway node.

In a preferred embodiment of the invention the calling identity is a PSTN number.

Since the caller is provided with a PSTN number to establish a call to another party, there is no need for the caller to have prior knowledge of a fixed PSTN number that is used by the other party to receive calls.

A further advantage of embodiments of the present invention is that since a dedicated PSTN number allocated to a called party for the purposes of establishing a call, the caller is only required to provide the PSTN number to the communication network when establishing the call.

A further advantage of embodiments of the present invention is that no information is required to be transmitted from the calling device in order to establish a call after a connection has been established with the PSTN network.

BRIEF DESCRIPTION OF THE DRAWINGS

For a better understanding of the present invention and as to how the same may be carried into effect, embodiments of the present invention will now be described by way of example only with reference to the following drawings.

DETAILED DESCRIPTION

Figure 1:
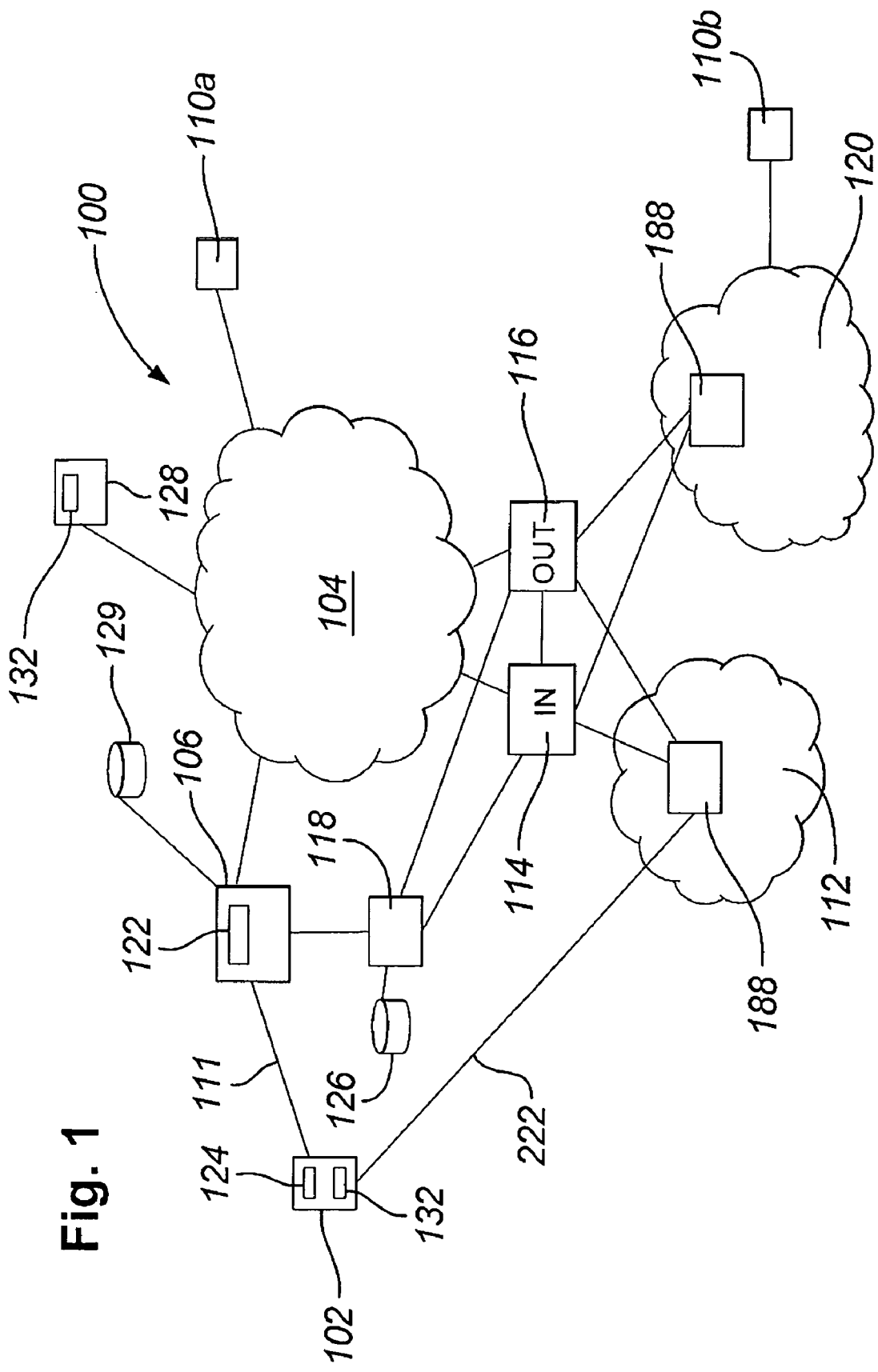
FIG. 1 is a schematic representation of a communication system in accordance with an embodiment of the invention.

Reference will first be made to FIG. 1, in which is shown a communication network 100, including a packet switched network 104 and circuit switched networks 112 and 120. In one embodiment the packet switched network 104 may be the internet. Data may be transmitted via the internet 104 via a peer to peer system. The circuit switched networks 112, 120 may be PSTN (Public Switched Telephone Network) networks.

A user device 102 is shown to be connected to the internet 104 via a session node 106. The user device 102 is also connected to the PSTN network 120. In one embodiment of the invention the user device is connected to the PSTN network 112 via a circuit switched connection 222 and to the session node 106 via a packet switched connection 111. The circuit switched connection 222 and the packet switched connection 111 may be provided by a GSM (Global System for Mobile Communications) network (not shown). For example the packet switched connection may be provided by a GPRS (General Packet Radio Service) connection of the GSM network whilst the circuit switched connection may be provided by a GSM audio connection of the GSM network. In a preferred embodiment of the invention the packet switched connection 111 is used to transmit packet data according to an internet protocol such as Transmission Control Protocol (TCP).

The user device 102 may be, for example, a personal computer, a gaming device, a personal digital assistant, a suitably enabled mobile phone, or other device able to connect to the network 104.

In accordance with an embodiment of the invention the session node 106 runs a communication instance 122 defining a session dedicated to a user of the user device 102. The communication instance 122 enables the user of the user device 102 to communicate across the communication network 100. The session node 106 is able to concurrently run a plurality of communication instances for a number of other users operating other user devices (not shown).

The user device 102 runs a client software program 124 that provides a client interface on the user device and allows the user of the user device 102 to communicate with the communication instance 122 running on the session node 106.

The client program 124 running on the user device has a number of different components or layers for implementing various functions, including a protocol layer 402 (FIG. 2a) for managing the interface with the GSM network. The interface with the GSM network will be described hereinafter with reference to FIG. 2b.

Figure 2A:
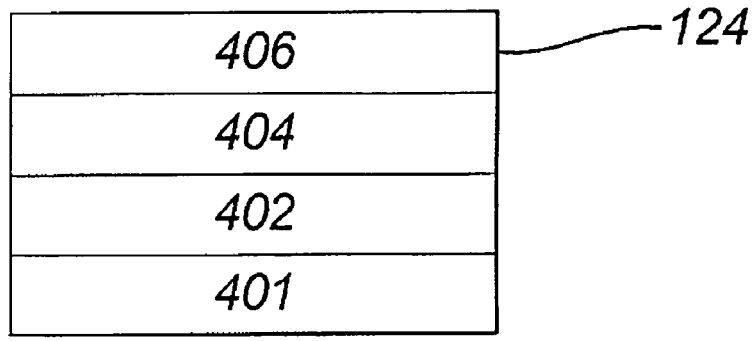
FIG. 2a is a diagram showing the protocol stack of a client program in accordance with an embodiment of the present invention.

FIG. 2a shows a protocol stack for the client program 124 according to an embodiment of the present invention. The protocol stack shows an operating system layer 401, a protocol layer 402, a client engine layer 404 and a client user interface layer 406. Each layer is responsible for specific functions. Because each layer usually communicates with two other layers, they are regarded as being arranged in a stack as shown in FIG. 2a. The operating system layer 401 manages the hardware resources of the user device 102 and handles data being transmitted to and from the session node 106. The operating system layer also handles the data being transmitted to and from the network 112. The client protocol layer 402 of the client software communicates with the operating system 401. Processes requiring higher level processing are passed to the client engine layer 404. The client engine 404 also communicates with the user client user interface layer 406. The client engine may be arranged to control the client user interface layer 406 to present information to the user via user interface means of the user device and to receive information from the user via the user interface means of the user device. The user interface means may comprise a speaker, a microphone, a display screen and a keyboard. This list is not exhaustive.

Figure 2B:
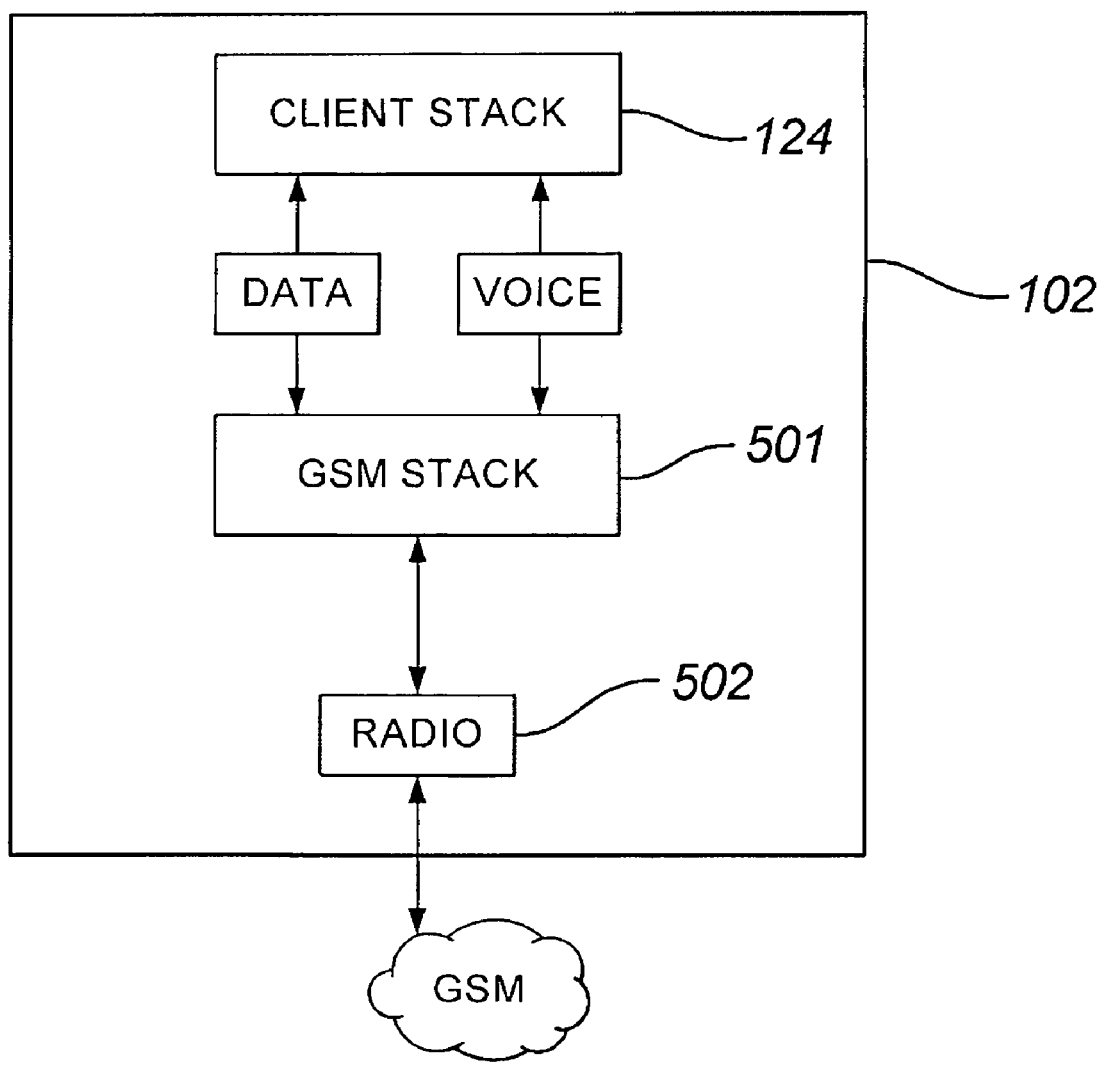
FIG. 2b is a schematic diagram showing the transmission of data between the client protocol stack and the GSM protocol stack in a user device in accordance with an embodiment of the present invention.

FIG. 2b is a schematic diagram showing the transmission of data between the client protocol stack and the GSM protocol stack in the user device 102. As shown in FIG. 2b the user device 102 further comprises a GSM protocol stack 501 and a radio transceiver 502. Information transmitted from the GSM network to the user device is received by the transceiver 502. The data received from the GSM network is processed by GSM protocol stack 501 before it is transmitted to the client program 124. Similarly, information to be transmitted to the GSM network from the client program 124 is processed by the GSM protocol stack 501 before it is transmitted to the GSM network via the transceiver 502. The operation of the GSM protocol stack 501 is known in the art and will not be described in detail herein.

Reference is again made to FIG. 1. As shown in FIG. 1 the peer to peer system on the internet 104 comprises an inbound gateway 114 and an outbound gateway 116. The inbound gateway 114 and the outbound gateway 116 are connected to PSTN gateways 188 located in the PSTN networks. The inbound gateway 114 is arranged to receive data for the peer to peer system on the internet 104 from the PSTN gateways 188. The outbound gateway 116 is arranged to transmit data from the peer to peer system on the internet 104 to the to the PSTN gateways 188.

Also shown in FIG. 1 is a profile node 128. The profile node 128 is responsible for storing user profile information for users of the peer to peer system. The user profile information includes login information for logging into the peer to peer system and a contact list 132 associated with each user of the peer to peer system. The contact list 132 comprises the addresses of, for example, other users of the communication system stored as contacts by a user.

Figure 3:
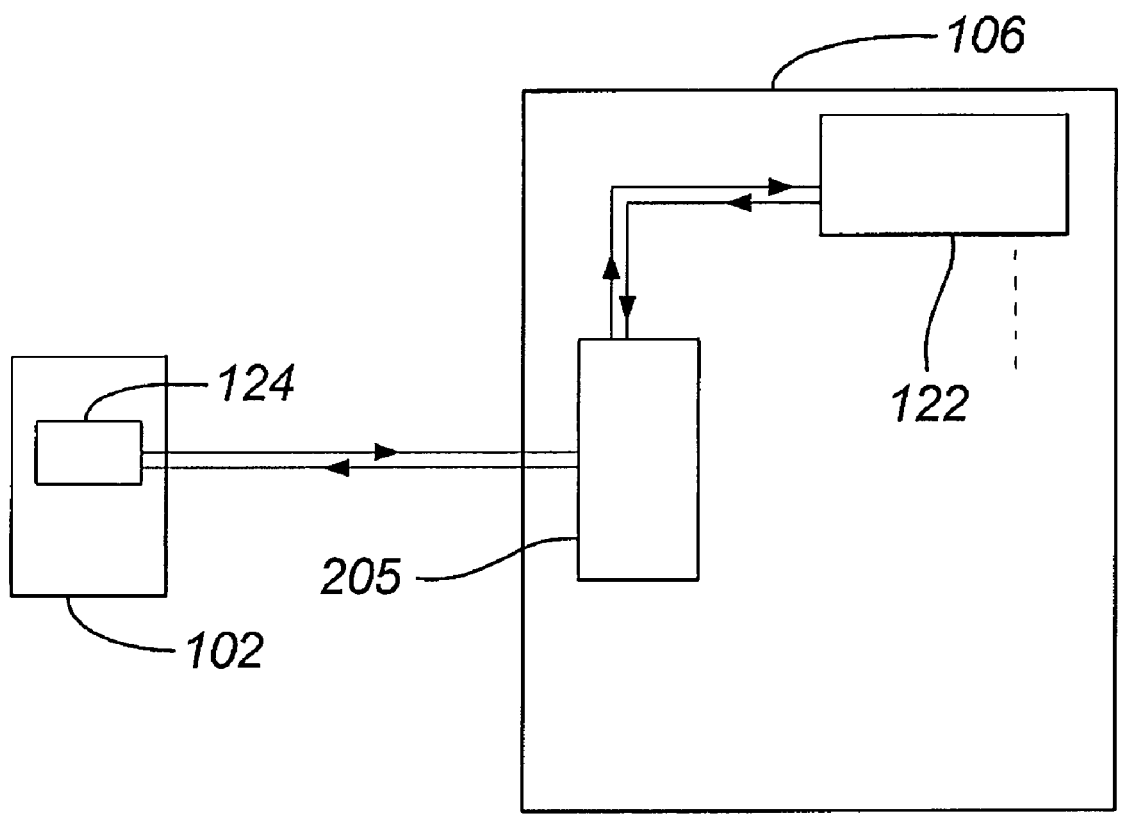
FIG. 3 is a schematic representation of part of the communication system shown in FIG. 1.

The communication instance 122 running on the session node 106 manages the communication between the client program 124 running on the device 102 and the peer to peer system on the internet 104. The communication instance may include a protocol adapter for handling communications using a different protocol. FIG. 3 shows the connection path between the communication instance 122 on the session node 106 and the client program 124 running on the user device 102. As shown in FIG. 3, the session node 106 further comprises a core module 205 for allocating a communication instance 122 to a client program 124.

In accordance with an embodiment of the invention the client program 124 running on the user device 102 is arranged to set up a connection with the session node 106. The client program 124 sends the session node 106 data relating to the user device 102 via the packet switched connection 111 in a data packet. The data packet may include the attributes listed in table 1:

TABLE 1

| KEY | TYPE | ATTRIBUTE |
| --- | --- | --- |
| CHUNKTYPE | integer | CLIENTDATA |
| DEVICE_PSTNNUMBER | string | device PSTN number in international notation. |

As shown in table 1, the data packet includes an attribute defining an IP address of the user device. Optionally the data packet may also define a PSTN number of the device. The PSTN address identifies the user device 102 in the PSTN network 112.

After a connection between the client program 124 and the session node 106 has been established the user of the user device may then provide login information to the session node 106 in order to log into the peer to peer system on the internet 104.

The session node may verify the login information provided from the user device against the profile information for the user of the user device 102 stored on the profile node 128. On verification of the login information provided from the user device 102 the core module 205 will assign a dedicated communication instance 122 to the client program 124.

The communication instance 122 associates the identity of the user of the user device, as defined by at least part of the login details of the user, with the identity of the device. In one embodiment of the invention the communication instance may store the identity of the user together with the IP address of the user device in a data store 129 associated with the communication instance.

According to an embodiment of the invention it is possible for the user of the user device to log into the peer to peer system using more that one user device. According to this embodiment of the invention the communication instance will associate the identity of each device with the identity of the user in the peer to peer system.

Once the session node 106 has assigned a communication instance 122 to the user device 102 the communication instance 122 will provide the client program 124 with data to enable to the client program to establish a communication event with an entity in the communication system 100.

The entity may be any node in the communication system 100 that is capable of receiving information from the user device 102. For example the entity may be another user device or a network node in the communication system 100. The entity may correspond to voice mail records, or other data records associated with the user of the user device. Additionally an entity may be a node arranged to carry out control commands in the network.

An entity is located by an address in the network in which it resides. The address of an entity that resides in the internet 104 may be for example an IP address, a URI (Uniform Resource Indicator), a username, or a VoIP device. The address of an entity that resides in the PSTN network may be a PSTN number associated with the entity.

In one embodiment of the invention the entity may correspond to more than one address in the communication network. For example the entity may be a user that is logged into the peer to peer system of the internet using two or more user devices. In this case an entity will have more than one associated addresses.

In accordance with an embodiment of the invention the user device 102 may establish a communication event with an entity via more than one type of network. For example the user device 102 may establish a call using the PSTN network 112 to an entity located in the internet 104.

In order to establish a communication event with an entity over more than one network it is necessary to identify the entity in each network.

In accordance with an embodiment of the invention the communication instance 122 is arranged to allocate an identity to an entity that may be transmitted and interpreted by both the PSTN network and the peer to peer system on the internet. In this case the identity of the entity may be resolved to the address of the entity by a node located in the internet 104. In a preferred embodiment of the invention the allocated identity is a PSTN number.

For example, if the entity is located in the internet, the IP address of the entity will not be recognized by the PSTN network. According to an embodiment of the invention the communication instance 122 is arranged to allocate a PSTN number to the entity that may be used to establish a call to the via the PSTN network. The allocated PSTN number may then be resolved to the IP address of the entity at a location in the internet 104.

As shown in FIG. 1 a call manager 118 is connected to the session node 106, the inbound gateway 114 and the outbound gateway 116. The call manager has access to a data store 126. In FIG. 1 the data store 126 is shown as being associated with the call manager.

Figure 5:
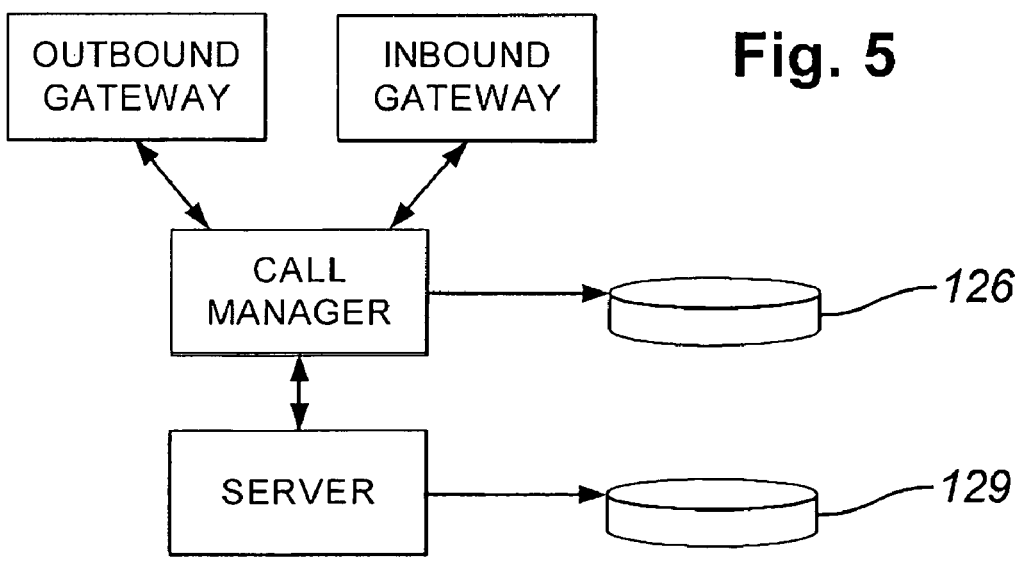
FIG. 5 shows the logical connections between a call manager, a session node, an inbound gateway and an outbound gateway according to an embodiment of the present invention.

In the embodiment shown in FIG. 1 the call manager 118 is shown as being located separately from the session node 106 and the gateways 114 and 116. In alternative embodiments the call manager 118 may however form part of either the session node 106 or of one of the gateways 114 or 116. The logical connections between the call manager, the session node, the inbound gateway and the outbound gateway are shown in FIG. 5.

The call manager 118 is arranged to provide the communication instance 122 with a PSTN number to be allocated to an entity in response to a request from the communication instance. The request may include the address of the entity. The call manager 118 is then arranged to store the allocated PSTN number in the data store 126 together with the address of the entity.

In one embodiment of the invention the address of an entity may be determined by the communication instance from the contact list 132 provided from the profile node 128. In this case the communication instance 122 may be arranged to retrieve the addresses of the entities of that are listed as contacts in the contact list 132 from the profile node 128.

The communication instance 122 is arranged to send the contact list 132 to the client program 124 in a data packet. Table 3 shows the attributes of the data packet containing the contact list 132. Each entity in the contact list is given an index value starting from 1. The attribute container containing the contact list may further include the contacts username, or URI for contacting the contact using the peer to peer system, and the name of the contact.

TABLE 3

| KEY | TYPE | ATTRIBUTE |
| --- | --- | --- |
| CHUNKTYPE | integer | BUDDY |
| BUDDYINDEX | integer | buddy index value, starting from 1 |
| AVAILABILITY | integer | buddy availability, this also has thin client specific extensions like "deleted" |
| SKYPENAME | string | buddy skypename |
| FULLNAME | string | |

Figure 4:
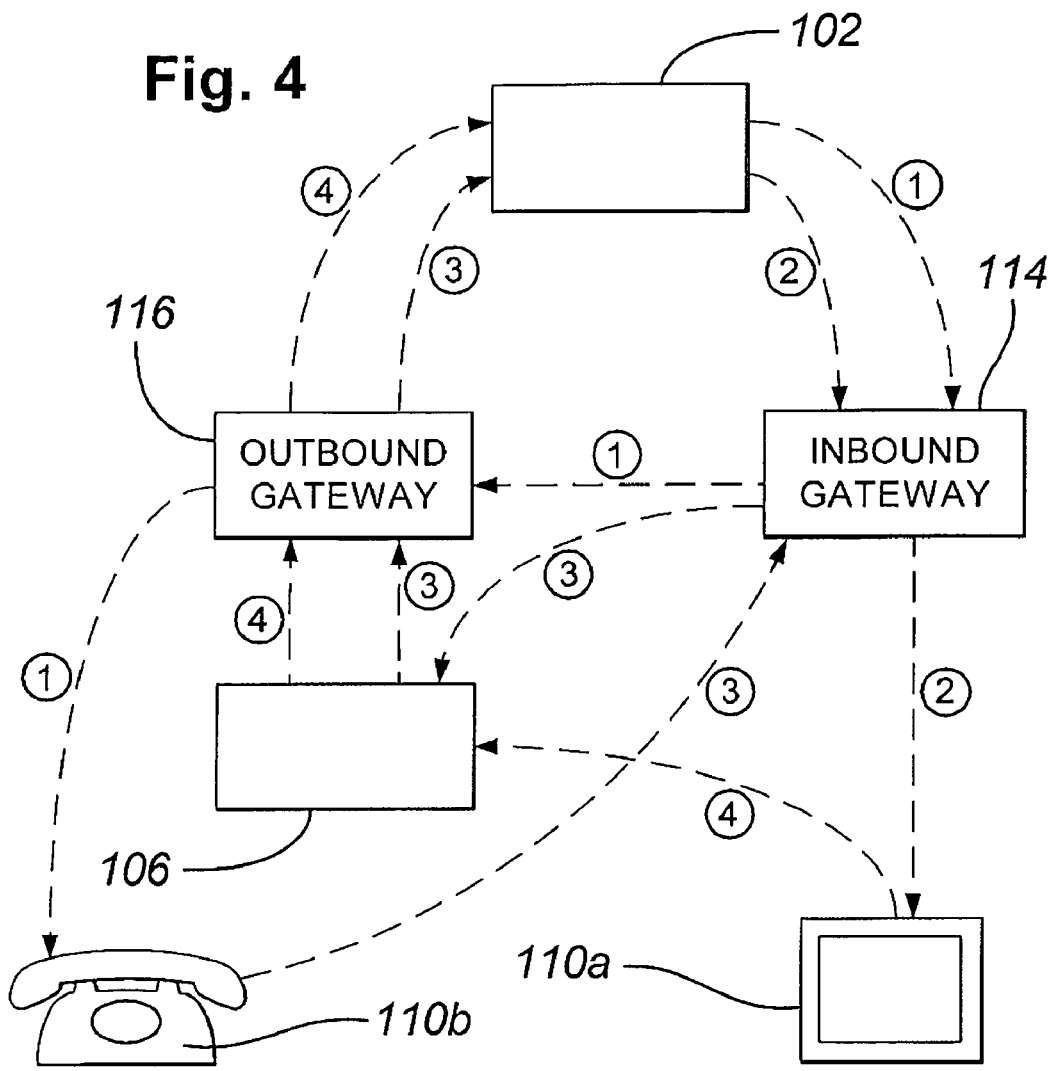
FIG. 4 shows the call connections made when placing calls between a user device and entities located in the communication system according to an embodiment of the present invention.

FIG. 4 shows the call connections made when placing calls between the user device 102 and entities located in the communication network. More specifically FIG. 4 shows the following call connections:

(1) an outbound call from the user device 102 to an entity 110b located in the PSTN network;

(2) an outbound call from the user device 102 to an entity 110a located in the internet 104;

(3) an inbound call to the user device 102 from an entity 110b located in the PSTN network; and (4) an inbound call to the user device 102 from an entity 110a located in the PSTN network.

As shown in FIG. 4, outbound calls made from the user device 102 to an entity are routed to the inbound gateway 114. The inbound gateway is then able to determine the address of the entity by querying the data store 126 via the logical connections illustrated in FIG. 5.

Figure 6:
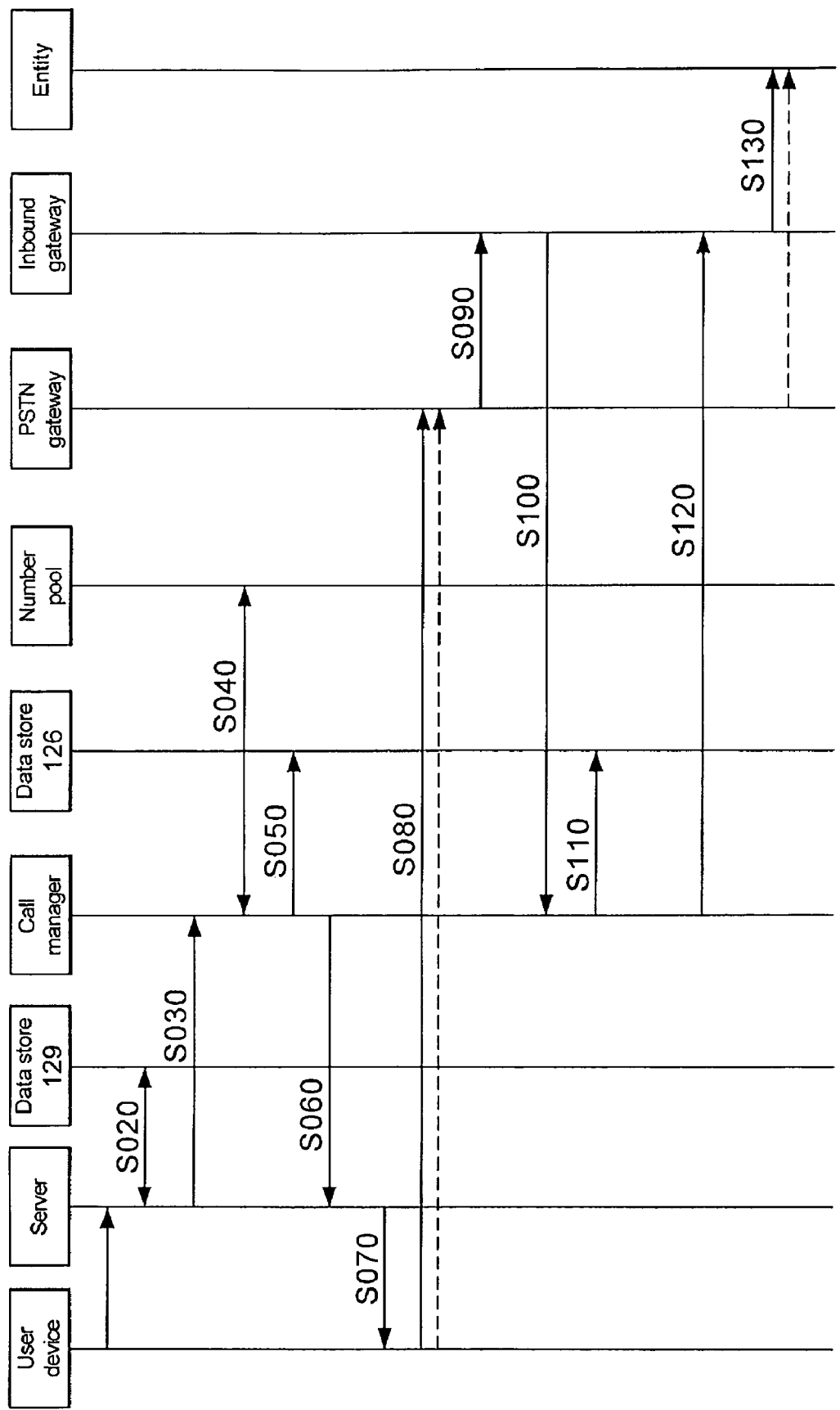
FIG. 6 is a diagram showing the initiation of a call in accordance with an embodiment of the present invention.

The method of calling an entity from the user device 102 will now be describe in detail in relation to FIG. 6. FIG. 6 shows the steps for placing a call from the user device 102. The steps involving the media data connection are indicated with broken lines, while the steps relating to the control data connection are indicated with solid lines.

In step S010 the user of the user device 102 initiates a call to an entity that is defined in the contact list 132 by selecting a link for that entity displayed by the user device 102. When the user attempts to initiate the call the client program 124 is arranged to transmit a PSTN number request to the session node 106 over the TCP data connection 111, together with an indication of which contact in the contact list the user is attempting to call. The indication may either be the entire contact details of the contact or an index for the contact.

In step S020 the communication instance 122 receives the PSTN request from the client program 124. If the contact that the user is attempting to call is defined by an index in the request, the communication instance is arranged to resolve the index into the address of the entity in the contact list 132 stored at the data store 129.

In step 030 the communication instance 122 is arranged to request a PSTN number from the call manager 118. The request includes the address of the entity that the user is attempting to call. The call manager 118 has access to a number pool data store 128. The number pool data store 128 stores a pool of available PSTN numbers that may be assigned to an entity for the duration of establishing a call.

In step S040 the call manager 118 is arranged to retrieve a PSTN number from the number pool 128. As the retrieved PSTN number cannot be allocated to more than one entity at a time the call manager is arranged to remove the PSTN number from the number pool 128.

In step S050 the retrieved number is stored in association with the address of the entity at the data store 126.

In step S060 the call manager 118 transmits the retrieved PSTN number to the communication instance running on the session node 106.

In step S070 the session node is arranged to transmit the allocated PSTN number to the client program 124 running on the user device 102 over the GSM packet switched connection 111.

In step S080, on receipt of the allocated PSTN number the client program 124 is arranged to dial the PSTN number in order to establish a call connection via the PSTN network with the entity. Both media data and control data are sent via the circuit switched connection 222. The control data sent via the circuit switched connection 222 comprises the PSTN number allocated to the called entity.

In step S090 the control data is routed from the PSTN gateway 188 to an inbound gateway 114 via the internet. The media data connection may be held at the PSTN gateway 188.

In step S100 the inbound gateway 114 transmits the control data comprising the PSTN number allocated to the entity to the call manager 118. The control data is transmitted via the internet 104.

In step S110 the call manager is arranged to query the data store 126 with the PSTN number of the device to determine the address of the entity.

In step 120 the call manager is arranged to transmit the address of the entity over the packet switched connection of the internet to inbound gateway 114. The call manager is also arranged to delete the number from the datastore 126 and to return the number to the number pool 128.

In step S130 the inbound gateway 114 accepts the media data from the PSTN gateway and uses the address of the entity received from the call manager to transmit the call to the called entity via packet switched network 104. Alternatively if the address of the entity is located in the PSTN network the inbound gateway will transmit the call to the PSTN network via the outbound gateway 116 (shown in FIG. 1).

In an alternative embodiment of the present invention the entity that the user of the user device 102 places a call to is not listed as a contact in the contact list 132. In this embodiment of the invention the user device 102 is arranged to provide the communication instance 122 with the address of the entity via the data connection 111 before initiating a call with the entity. A call may then be placed to the entity via the PSTN network in accordance with the method steps described in relation to FIG. 6.

In one embodiment of the invention the address of an entity may specify the location of a voicemail record associated with the user. The address of a voicemail record may be determined using the username of the user and the address of a voicemail node. The address of the voicemail node may be prestored in the data store 126.

In one embodiment of the invention the communication instance is arranged to provide information relating to the geographical location of the user device 102 to the call manager 118 when requesting a PSTN number. In this embodiment of the invention the call manager is arranged to provide the communication instance 122 with PSTN numbers that relate to PSTN gateways that are local to the user device, otherwise referred to as a local number.

In an alternative embodiment of the invention, for some entities the call manager is arranged to instruct the inbound gateway to not accept the call and instead to provide the PSTN gateway with routing information to route the call via the PSTN network. These entities may be predetermined and may relate to emergency numbers for contacting the emergency services. For example, if the address of the entity is determined to be a predetermined PSTN number such as '999' which is permanently stored in the data store 126, the call manager may be arranged to instruct the inbound gateway While this invention has been particularly shown and described with reference to preferred embodiments, it will be understood to those skilled in the art that various changes in form and detail may be made without departing from the scope of the invention as defined by the claims.

What is claimed is:

1. A method of transmitting a communication event from a calling entity to a called entity located in a communication network comprising a first network and a second network, the method comprising:
   determining a first identity associated with the called entity, wherein the first identity is recognizable in the first network;
   allocating a second identity to the called entity, wherein the allocated identity is recognizable in the second network;
   associating at a first node located in the first network the first identity with the second identity;
   providing the second identity to the calling entity;
   establishing a connection with a second network node located in the second network;
   wherein the connection with the second network node is established using the second identity;
   querying the first node with the second identity associated with the called entity to determine the first identity associated with the called entity;
   transmitting the communication event to the called entity using the first identity associated with the called entity; and
   disassociating the second identity from the called entity after querying the first node to determine the first identity associated with the called entity.

2. A method as claimed in claim 1 wherein the second identity is allocated to the called entity in response to receiving a second identity request from the calling entity.

3. A method as claimed in claim 2 wherein the second identity request is transmitted via the first network.

4. A method as claimed in claim 1 wherein allocating a second identity to the called entity comprises:
   selecting an identity from a pool of available identities; and
   allocating the selected identity to the called entity.

5. A method as claimed in claim 4 wherein the selected identity is removed from the pool of available identities.

6. A method as claimed in claim 1 wherein associating the first identity with the second identity comprises storing the first identity with the second identity at the first node.

7. A method as claimed in claim 6 wherein disassociating the second identity from the called entity comprises removing the second identity from the first node.

8. A method as claimed in claim 7 wherein disassociating the second identity from the called entity further comprises returning the second identity to the pool of available identities.

9. A method as claimed in claim 2 wherein the second identity request identifies the called entity.

10. A method as claimed in claim 2 wherein the second identity request comprises the first identity of the called entity.

11. A method as claimed in claim 10 wherein determining the first identity of the called entity comprises determining the first identity of the called entity from the second identity request.

12. A method as claimed in claim 9 wherein the calling entity is associated with a contact list.

13. A method as claimed in claim 12 wherein the contact list comprises a list of identities for a plurality of entities, wherein one of said identities is the first identity associated with the called entity.

14. A method as claimed in claim 13 wherein determining the first identity comprises determining the first identity of the called entity from the contact list associated with the second identity, using the second identity request identifying the called entity.

15. A method as claimed in claim 1 wherein the first identity associated with the called entity defines a plurality of end points in the communication network.

16. A method as claimed in claim 1 wherein the called entity is a user of the communication system.

17. A method as claimed in claim 1 wherein the called entity is a voicemail record.

18. A method as claimed in claim 1 wherein the called entity corresponds to an entity arranged to carry out a control command.

19. A method as claimed in claim 1 wherein the second identity is a local number.

20. A method as claimed in claim 1 wherein the communication event is routed to an entity via the second network if the first identity defines an emergency number.

21. A routing node arranged to route a communication event from a calling entity to a called entity located in a communication network comprising a first network and a second network, said routing node comprising:
   determining means arranged to determine a first identity associated with the called entity, wherein the first identity is recognizable in the first network;
   allocating means arranged to allocate a second identity to the called entity, wherein the second identity is used to establish a connection with a node in the second network; and to provide the second identity to the calling entity;
   storing means arranged to store the first identity in association with the second identity;
   retrieval means arranged to search the data store with the second identity to determine the first identity associated to the called entity in response to a query from a gateway node, and to provide the gateway node with the first identity such that the gateway node may transmit the communication event to the called entity using the first identity associated to the called entity; and
   disassociating means arranged to disassociate the second identity from the called entity after retrieval means has provided the first identity to the gateway node.

* * * * *